Aug. 23, 1938.   J. B. JACOBS   2,127,774
APPARATUS FOR TEACHING OBSTETRICS
Original Filed April 27, 1936    2 Sheets-Sheet 1

Inventor
J. Bay Jacobs
By Patrick D. Beavers
Attorney

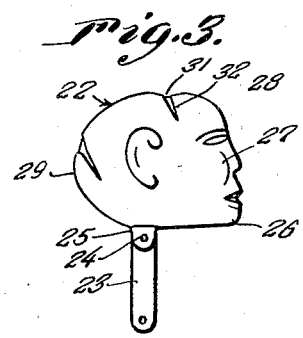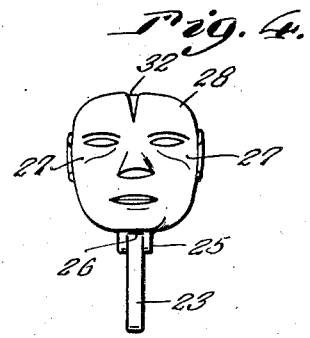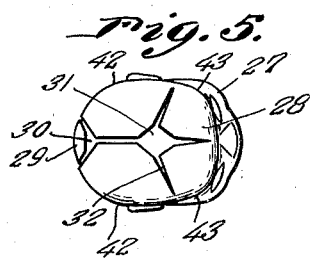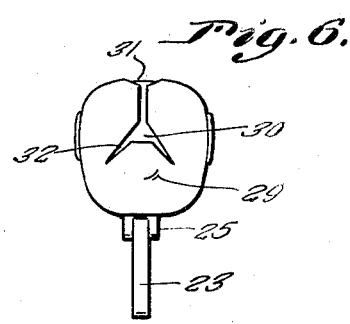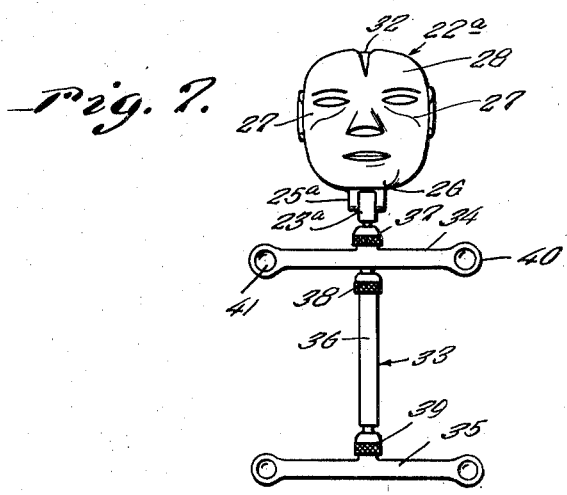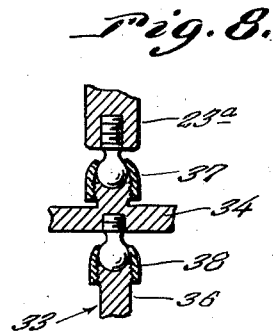

Patented Aug. 23, 1938

2,127,774

UNITED STATES PATENT OFFICE 2,127,774

APPARATUS FOR TEACHING OBSTETRICS

Julian Bay Jacobs, Arlington County, Va.

Application April 27, 1936, Serial No. 76,666
Renewed January 12, 1938

16 Claims. (Cl. 35—17)

The present invention relates to new and useful improvements in educational appliances, and more particularly to an apparatus for teaching the practice of obstetrics.

Heretofore teachers of obstetrics have been compelled to instruct the student in the mechanisms of labor through the medium of appliances which are difficult to manipulate, and with which the teacher can only hope to convey to the student the broad rudiments, and not the valuable details incident to the natural mechanisms of labor, without considerable filling-in by way of imagination on the part of the student and explanation by the instructor of what the manikin is incapable of demonstrating.

The prior practice has been to use a structure which to some extent may simulate a pelvic organization supplemented by some structure resembling a uterus, and with this there has invariably been used either a dead baby or what is commonly referred to as a "chamois doll". The preserved baby is impractical because of its rigidity, and while the chamois doll is a little more pliable, it is quite expensive and quickly becomes undesirable for use. The stretching of the chamois doll when putting it through the mechanisms incident to illustrating labor causes the doll to lose its shape and to become soiled, torn, and unfit for use in a short time.

The principal object of the present invention is to provide an apparatus, either permanent or portable, which will be considerably more durable than any known means, and wherein features are provided which will yield to the student a greater knowledge of the mechanisms of labor and conditions incident thereto during a demonstration, while at the same time permitting the instructor to lecture uninterruptedly while he is manipulating the artificial fetus.

Another important object of the invention is to provide an artificial fetus for use with pelvic manikins wherein the artificial fetus is so marked and formed as to make prominent various important landmarks which must be known to the skilled obstetrician.

Still another important object of the invention is to provide an apparatus involving a pelvic manikin and an artificial fetal head, with the artificial head substantially smaller in size than the natural proportionate relationship between an actual fetal head and its related pelvic orifice, to the end that free delivery of the head through the pelvic orifice in the manikin can be consummated with ease and unlikelihood of any binding action.

Still another important object of the invention is to provide an apparatus of the character stated including a pelvic manikin supplemented by an adjustable pan corresponding to the uterus, and in conjunction with an artificial fetal head and a skeleton frame structure attached thereto in such a manner that the artificial fetus in its entirety can be progressed from the pan into the pelvic tract where the frame structure can be adjusted in such a manner as to take the form and course that would ordinarily occur in a live fetus during the processes of labor.

The reader will observe other important objects and advantages of the invention during the following specification.

In the drawings:

Figure 3 is a side elevational view of one form of artificial head;

Figure 4 is a front elevational view of the head form shown in Figure 3;

Figure 5 is a top plan view of the head;

Figure 6 is a rear elevational view of the head;

Figure 7 is a front elevational view of a modification showing a complete artificial fetus;

Figure 8 is an enlarged fragmentary detailed sectional view through certain joints of the modified artificial fetus.

Figure 1:
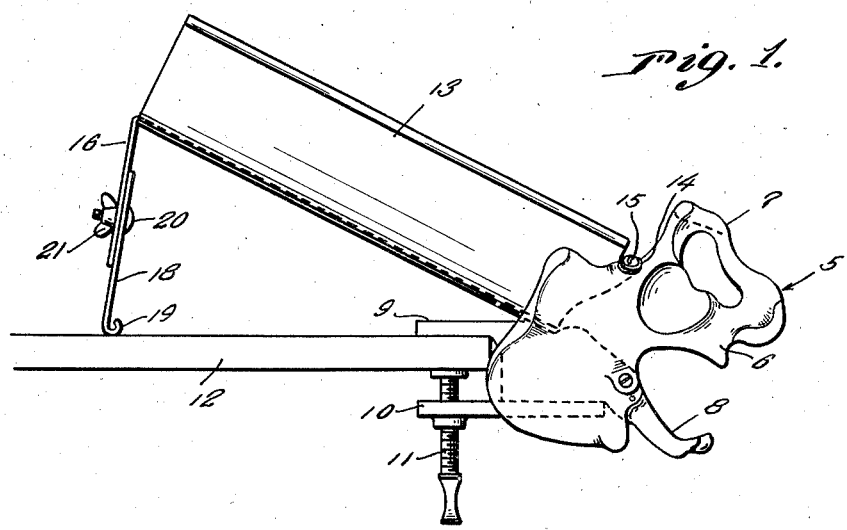
Figure 1 represents a side elevational view of the manikin shown attached to a table top.
Figure 2:
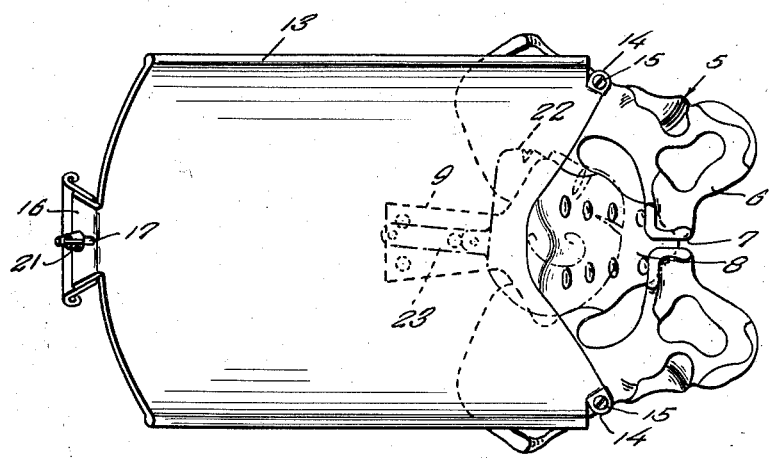
Figure 2 is a top plan view of the manikin.

Referring to the drawings wherein like numerals designate like parts, it can be seen in Figures 1 and 2 that the manikin includes a pelvic construction generally referred to by the numeral 5, representing the various important parts of the real pelvic bone construction. Briefly, the pubic arch is shown and denoted by numeral 6, while the symphysis is indicated by numeral 7. Numeral 8 denotes the sacrum and from the rear of this project the the parallel plates 9—10 which are provided preferably in the portable form of manikin illustrated. A clamp screw 11 is feedable through the lower plate 10 and can be driven against the under side of a table top or like structure 12 for holding the manikin out beyond one edge of the table top.

To simulate a half portion of the uterus, a transversely curved pan 13 is provided and is equipped at its forward end with apertured ear members 14 through which screws 15 can be disposed and driven into the pelvic construction so that the forward end of the pan comes flush with the pelvic inlet.

The ears 14 and the screws 15 are situated in such a manner that the pan 13 is free to swing in a vertical plane to an appreciable extent.

To permit adjustment and retention of the pan 13 at various vertical adjustments, the rear end of the pan 13 is provided with a depending tongue 16 having a longitudinally extending slot 17 therein. Numeral 18 is a supporting plate having its lower bearing edge rolled as at 19. This supporting plate 18 has an opening therein through which the bolt 20 is disposed and this bolt is also disposed through the slot 17 in the tongue 16 and is equipped with a wing nut 21 which can be tightened against the tongue 16 so as to bring the tongue 16 and plate 18 snugly together, to support the plate 13 in any degree of inclination desired.

Now referring to the artificial birth object shown in Figures 3 to 8, inclusive, it can be seen that in Figures 3 to 6 the head generally referred to by numeral 22 is provided with a neck member denoted by numeral 23 which can also be used as a handle by the instructor. This neck member 23 which corresponds to the neck of the birth object is pivotally connected to the head by a pin 24 and ears 25 on the head. It can be seen that the longitudinal axis of this neck member 23 is offset posteriorly to a line drawn axially through the ears represented on the head 22.

Observing Figures 3 and 4, it can be seen that the chin 26 is prominent and this is likewise true of the malar bones 27 which aid in the demonstration of the mechanisms of labor in brow presentation. The brow is denoted by numeral 28 and is clearly shown in Figure 3. The occiput is in prominence and denoted by numeral 29.

By inspecting Figure 5, it can be seen that the posterior and anterior fontanels generally referred to by numerals 30—31, respectively, and their sutures 32 are made distinctively representative on the head by being in the form of depressions with these depressed areas preferably painted or otherwise colored black or any other suitable and desired color.

To complete the artificial fetus, a frame work generally referred to by numeral 33 is provided and consists of the cross member 34 corresponding to the shoulders and numeral 35 represents another cross member corresponding to the hips. Numeral 36 is a connecting member between the cross members 34—35. The head 22ª shown in the complete artificial fetus is provided with a short neck extension 23ª pivotally connected to the head as at 25ª. A ball and socket connection 37 connects the lower end of the neck member 23ª to the intermediate portion of the cross member 34. The upper end of the connecting member 36 which corresponds to the spine is connected to the intermediate portion of the cross member 34 by the universal joint 38, while another universal joint 39 connects the lower end of the connecting member 36 to the intermediate portion of the other cross member 35.

The ends of the cross members 34—35 are enlarged as at 40 to correspond to shoulders or hips, and it is preferable that these enlargements 40 be made concaved as at 41 on their front sides so as to indicate the front from the back of the frame.

Obviously, in considering the mechanism of persistent occiput posterior activity, extension is recognized as a causative factor. For when the head is moderately extended, the sinciput comes in contact with the pelvic floor and rotates anteriorly, conveying the occiput into the hollow of the sacrum. To demonstrate this feature with the chamois doll or a normal fetus, it is necessary to extend the head to a brow or almost a face presentation. With the skull shown, moderate deflection will bring the sinciput lower than the occiput, enabling one to demonstrate intelligently the mechanism of occiput posterior activity.

To aid in the demonstration of the mechanisms of labor in brow presentation, the malar bones are made prominent on the fetal head.

It will be seen that the particular connecting point of the neck member 23 to the head is purposely displaced considerably toward the back of the head so as to clearly illustrate flexion and extension depending upon the character of delivery.

Although the diameters of the pelvis may be considered as normal, those of the fetus head have been slightly reduced in proportion in order to permit flexion, extension, and impel rotation to occur in the cavity of the true pelvis.

The frame construction 33 of the artificial fetus cooperates with the pan 13 corresponding to the uterus, so that the instructor is able to illustrate the meaning of uterine contraction. Normally, in pregnancy, we can assume that the longitudinal axis of the uterus is oblique with respect to the axis of the pelvic orifice and that the function of uterine contraction is to move the uterus in such a manner as to bring it into substantial alignment with the orifice, and this is practicably demonstrated by lifting and lowering the pan 13 with the full artificial fetus shown in Figure 7 disposed thereon, or in some instances, it may be preferred to use a dead baby.

Obviously, with the frame work construction 33, not only can the mechanisms of labor in vertex and face presentations be demonstrated, but also breech presentation.

It is also noted that the head is so formed that the biparietal diameter is clearly apparent (see 42—42) and can be compared with the bitemporal diameter (see 43—43).

While the foregoing specification sets forth the invention in specific terms it is to be understood that various changes in the shape, size and materials may be resorted to without departing from the spirit of the invention or the scope of the claims appended.

Having described the invention, what is claimed as new is:

1. In combination with a pelvic manikin, an artificial fetal structure having a head smaller in size than the natural proportioned relationship between a fetus and its related pelvic orifice, said fetal structure including a frame provided with prominent portions corresponding to the shoulders and hips of a natural fetus with the usual bulk of flesh and muscle thereon.

2. A portable obstetrics teaching device comprising a pelvic manikin, an artificial fetal head, means on the manikin permitting ready attachment of the manikin to a convenient support, and a pan secured at one end to the manikin and corresponding to a longitudinal posterior portion of a uterus upon which the artificial fetal head is preparatorily supported, said pan being provided with adjusting means whereby the pan can be adjusted to various oblique positions anteriorly with respect to the spinal line of the manikin.

3. A portable obstetrics teaching device comprising a pelvic manikin, an artificial fetal head, means on the manikin permitting ready attachment of the manikin to a convenient support, a pan secured at one end to the manikin and corresponding to a longitudinal half section of a uterus upon which the artificial fetal head is preparatorily supported, said pan being pivotally secured to the manikin and provided with means whereby it can be adjusted in a vertical plane.

4. A portable obstetrics teaching device comprising a pelvic manikin, an artificial fetal head, means on the manikin permitting ready attachment of the manikin to a convenient support, a pan secured at one end to the manikin and corresponding to a longitudinal half section of a uterus upon which the artificial fetal head is preparatorily supported, said pan being pivotally secured to the manikin and provided with means whereby it can be adjusted in a vertical plane, said last-mentioned means consisting of a support engageable and extensible prop depending from the outer end of the pan.

5. An artificial fetal head having depressed areas therein simulating in shape the posterior and anterior fontanels with their related sutures, the bottoms of said fontanels being closed to make their shape and location well defined.

6. An artificial fetal head having depressed areas therein simulating in shape the posterior and anterior fontanels with their related sutures, said head being provided with an abnormally pronounced occiput.

7. An artificial fetal head having depressed areas therein simulating in shape the posterior and anterior fontanels with their related sutures, said head being provided with abnormally pronounced occiput, and chin portions.

8. An artificial fetal head having depressed areas therein simulating in shape the posterior and anterior fontanels with their related sutures, said head being provided with abnormally pronounced malar bones portions.

9. In combination with a pelvic manikin, an artificial fetal head of a size capable of being moved through the pelvic manikin, and a handle on the head for holding the head while it is being operated through the manikin.

10. In combination with a pelvic manikin, an artificial fetal head of a size capable of being moved through the pelvic manikin, a handle on the head for holding the head while it is being operated through the manikin, said head being provided with grossly enlarged natural prominences of such protrusion from the head proper as to barely permit the head with these prominences to pass through the manikin, said handle being pivotally connected to the head and serving to simulate the neck portion of the fetus.

11. An artificial fetal head in combination with a member pivotally connected thereto, said member being connected to the base of the head for holding the head while it is being operated through the manikin, said head being provided with grossly enlarged natural prominences of such protrusion from the head proper as to barely permit the head with these prominences to pass through the manikin at a point posteriorly with respect to a line drawn axially through the ear portions of the head.

12. In combination with a pelvic manikin, a uterus simulating pan, said pan being supported at one end by the manikin, and adjusting means at its apposite end whereby the pan can be vertically adjusted.

13. In combination with a pelvic manikin, a fetus supporting structure extending therefrom.

14. A manikin comprising a head, an elongated member simulating a spinal column, a pair of cross members on the elongated member simulating shoulders and hip portions, said elongated member being of sectional construction, and universal connections between the ends of the sections and the said shoulders and hip portions.

15. A manikin comprising a head, in combination with a pelvic structure, said head being provided with abnormally enlarged natural prominences of such protrusion from the head proper as to barely permit the head with these prominences to be passed through the pelvic structure.

16. A manikin comprising a head, a member pivotally connected at one end to the head and simulating the spinal portion of a neck, said member being connected to the head at a point substantially posterior to a line extending vertically through the head, the top of the head being constructed so that a slight depression of the sinciput will elevate the occiput above the sinciput.

JULIAN BAY JACOBS.